UNITED STATES PATENT OFFICE.

JAMES H. CONNOR, OF NASHVILLE, TENNESSEE.

PROCESS OF MAKING FERTILIZER.

931,846.

Specification of Letters Patent. Patented Aug. 24, 1909.

No Drawing. Application filed October 14, 1908. Serial No. 457,633.

*To all whom it may concern:*

Be it known that I, JAMES H. CONNOR, a citizen of the United States, residing at Nashville, in the county of Davidson and State of Tennessee, have invented certain new and useful Improvements in Processes of Making Fertilizer, of which the following is a specification, reference being had therein to the accompanying drawing.

My invention relates to certain new and useful improvements in the process of extracting phosphoric acid from phosphate rock, phosphate pebbles, bone phosphate, lime and bones, or other substances containing phosphoric acid that are insoluble without the use of acid.

My method is further applicable to those low grade phosphate rocks which contain sandy matter, or dirt, and which are with difficulty marketable or actually unsalable.

By using an admixture of alkali (as sodium or potassium hydroxids or carbonates) and alkaline earth (as calcium, magnesium or barium hydroxids) the process of rendering the phosphates available is cheapened over the use of an alkali, alone, since the usual cost of the alkaline earth is less than that of the alkalies. That is, caustic lime costs less than caustic soda or caustic potash.

A distinct advantage in the use of caustic or quicklime, is that the silica, or sand which is contained in the class of phosphate rocks above mentioned, is attacked by the lime and fused into a silicate of lime, or slag, at the temperature employed and thus practically leaves the phosphate rock free to be attacked by the caustic soda, whereas if no lime were used, an equivalent amount of caustic soda or of potash would be required to eliminate the sand in the form of sodium or potassium silicates, thus materially increasing the cost by the difference in prices between lime and caustic soda or potassa.

In carrying out my invention I take the phosphate rock or other substances containing insoluble phosphoric acid and crush or grind it so that the same will pass through a sixteen hole mesh screen to the inch, or finer if desired, to be readily acted upon say, one thousand five hundred and twenty-five pounds of phosphate rock or other like substances as hereinbefore noted, two hundred and seventy-five pounds of an alkali, as sodium hydroxid, and two hundred pounds of alkaline earth, as calcium oxid, or quicklime. Water is then added and mixed until the mass has a consistency of thick mud, whereupon the admixture is introduced to a furnace or retort which has been previously charged with either coal, wood, coke, oil, or any combustible matter that will produce heat, running from 1500 to 2000° Fahrenheit, the admixture remaining in the said furnace or retort from one hour to one hour and thirty minutes, when the phosphoric acid will become soluble.

The manner in which the chemical reactions occur may be represented as follows, supposing a silicious or sandy variety of phosphate rock or about 69% of bone phosphate is acted upon:

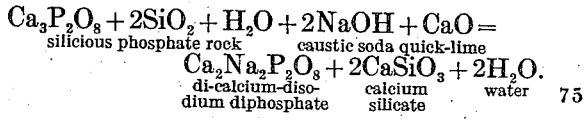

$$Ca_3P_2O_8 + 2SiO_2 + H_2O + 2NaOH + CaO =$$
silicious phosphate rock    caustic soda  quick-lime
$$Ca_2Na_2P_2O_8 + 2CaSiO_3 + 2H_2O.$$
di-calcium-diso-    calcium    water
dium diphosphate   silicate The dicalcium - disodium diphosphate or calcium-sodium phosphate represents a substitution compound, in which the monatomic element, sodium, substitutes hydrogen in the dicalcium phosphate $Ca_2H_2P_2O_8$ or $2CaHPO_4$.

The caustic soda and the quick-lime are slightly in excess of theoretical proportions, but not materially so. In practice we should vary the proportions to conform to the quality of the phosphate rocks upon which we should operate. For lower and sandier grades the amount of quick-lime would be increased, in order to remove the silica from the field and give the caustic soda freer access to the calcium phosphate as it exists in the rocks.

I have found good results from mixtures of rock, sand etc., soda, and lime as follows:

| Rock. | Soda. | Lime. |
|---|---|---|
| 10 parts | 1 part | 4 parts |
| 6 " | 1 " | 3 " |
| 5 " | 1 " | 2 " |
| 25 " | 6 " | 9 " |
| 14 " | 3 " | 3 " |
| 61 " | 11 " | 8 " |

I thus secure a concentrated product rich in available phosphoric acid, which, after being ground into a pulverulent condition, can be distributed by drills with facility, or it can be packed for the market without further treatment. Furthermore, the soluble superphosphate and free phosphoric acid contained in the residuum are not liable to revert into their insoluble condition.

I claim—

The herein described method of producing a phosphate, which consists in reducing five parts of phosphate rock or calcium phosphate to the form of a powder, adding one part of caustic soda and two parts of quick lime and mix in water until the same assumes the consistency of thick mud, and finally subjecting this mixture to a high degree of heat until the phosphoric acid becomes available.

In testimony whereof I hereunto affix my signature in presence of two witnesses.

JAMES H. CONNOR.

Witnesses:
GILBERT LACKEY,
LYTTON TAYLOR.